Figure 1:
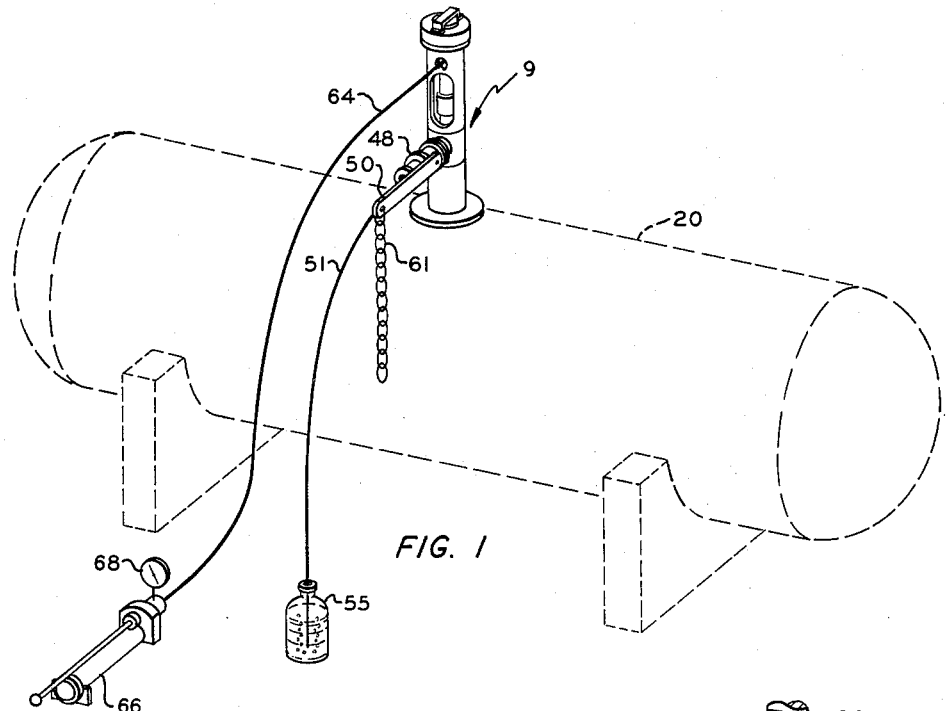

July 16, 1963 E. E. REED ETAL 3,097,516
SAFETY DEVICE FOR USE IN TESTING RELIEF
VALVES ON PRESSURIZED FLUID CONTAINERS
Filed March 21, 1960 2 Sheets-Sheet 1

INVENTORS
E.E. REED
J.W. HALE
F.S. HAMLIN
BY Hudson & Young
ATTORNEYS

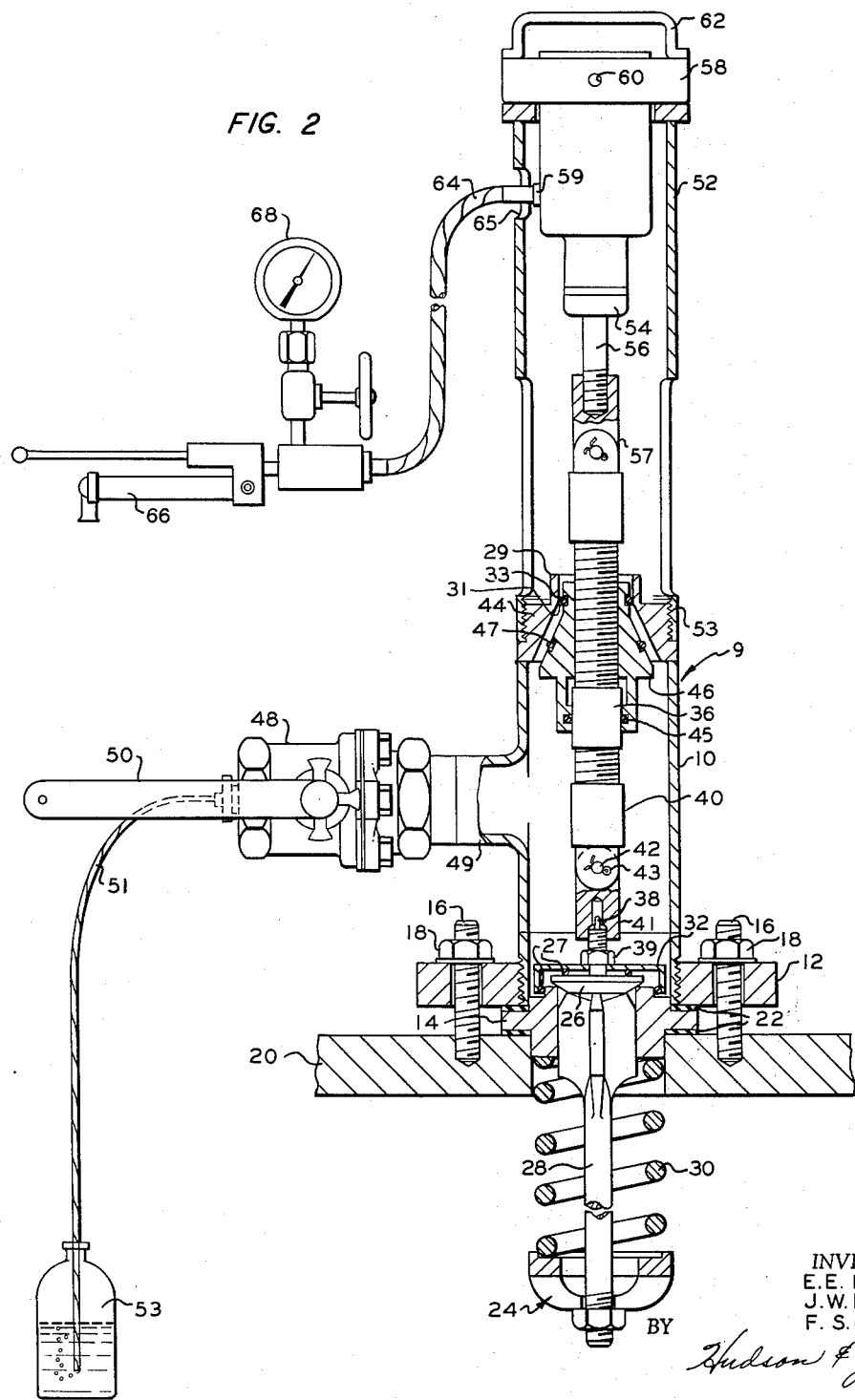

United States Patent Office 3,097,516
Patented July 16, 1963

3,097,516
SAFETY DEVICE FOR USE IN TESTING RELIEF VALVES ON PRESSURIZED FLUID CONTAINERS
Edwin E. Reed, John W. Hale, and Frank S. Hamlin, Bartlesville, Okla., assignors to Phillips Petroleum Company, a corporation of Delaware
Filed Mar. 21, 1960, Ser. No. 16,507
15 Claims. (Cl. 73—4)

This invention relates to an improved process and safety device for testing relief valves on containers filled with volatile fluids under pressure.

In the art of distributing fluids under pressure in cylinders and storage tanks, it is very important to provide these vessels with a pressure relief valve that will be sure to open if a safe pressure is exceeded by the fluid inside the vessel. Even a single accident caused by the rupturing of a container in the distribution or use by the consumer of domestic cooking gas or industrial fuel gas, or other gases in pressurized containers might very well result in considerable damage to equipment and injury to personnel. A test of the safety valve at reasonable time intervals is good practice. Devices for testing spring-operated safety valves are fully described in the disclosure of U.S. Patent 2,419,293, issued to H. E. Simonson, April 22, 1947, and in U.S. Patent 2,952,151, issued to H. E. Simonson and E. E. Reed (S.N. 508,396, filed May 16, 1955).

In the operation of such a testing device as that shown in the first said patent, should the spring on the relief valve break or the valve otherwise fail to seal the relief port, complete loss of product would result with attendant hazards from possible fires, explosions, toxicity, etc. The invention in said application provides a safety device which forms a sealed enclosure around the relief valve port in the event the valve fails to function during or at the end of the testing procedure, thereby preventing loss of the contents of the tank or container in which the valve is positioned and avoiding the hazards accompanying such loss.

Relief valves sometimes leak at internal pressures considerably below the pressure required for venting (lifting the valve head off its seat). The apparatus of both aforesaid disclosures do not permit testing for leaks of this nature. This invention is concerned with this problem.

The principal object of the invention is to provide an improvement in a safety device for testing relief valves on fluid pressurized containers, such as storage and dispensing tanks and cylinders, which permits the detection of leaks around said valves and the determination of "start-to-discharge" pressure of such valves. Another object is to provide a process for detecting leakage thru a relief valve on a storage vessel under fluid pressure when testing valve operation. A further object is to provide an improvement in the hydraulic valve testing means for a pressure relief valve which is disclosed in application S.N. 508,396 (U.S. Patent 2,952,151). Other objects of the invention will become apparent upon consideration of the accompanying disclosure.

The device of the aforesaid application comprises a housing enclosing the attaching end of a valve actuating rod adapted to pull the relief valve head off its seat, the housing having means on one end for sealing attachment to an element of the valve body or surrounding tank structure, an inwardly-facing valve seat in the opposite end of the housing, and an outwardly-facing valve head on the actuating rod spaced a short distance from the seat. The actuating rod attaches to the relief valve head by any suitable means and the opposite end is adapted to connect with any suitable operating means such as a lever or hydraulic cylinder. Upon axial movement of the actuating rod in lifting the relief valve head from its seat so as to test the pull required to operate the same against the compression of its spring, gas escapes from the tank or cylinder in which the relief valve is positioned into the housing enclosing the actuating rod and is vented to the atmosphere through a valve in the side of the housing. In the event of failure of the relief valve for any reason, such as spring or stem breakage, the valve head in the housing is forced against the seal in the end of the housing and prevents escape of gas through the valve port. When this occurs, the auxiliary valve in the side of the housing is manually closed by the operator so as to seal the housing to prevent escape of gas therefrom.

One aspect of this invention is an improvement in the apparatus of U.S. Patent 2,952,151, comprising sealing means around the outer end of the actuating rod to form a sealed zone inside the rod housing and a small bore tube connected with the auxiliary valve in the side of the rod housing to permit detection of small leaks thru the relief valve before the valve is lifted off its seat. Another aspect of the invention comprises a process for testing for small leaks thru a safety relief valve on a pressure tank containing volatile liquid or gas under pressure. This process comprises providing an enclosed testing zone sealed with said tank around the relief valve and extending outwardly therefrom; gradually pulling on the head of said valve until venting force is reached; passing any gaseous fluid escaping into said zone thru said valve, from prior to application of pressure until said valve head is lifted off its seat, thru a gas detecting zone to detect slow leakage thru said valve. The valve is then lifted off its seat to effect the desired testing of its relief operation and the pressure at which it will lift off its seat.

Figure 3:
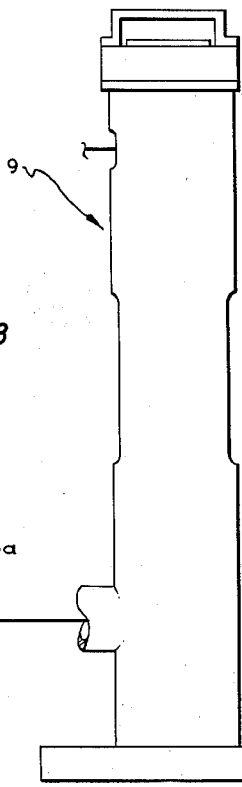
Figure 4:
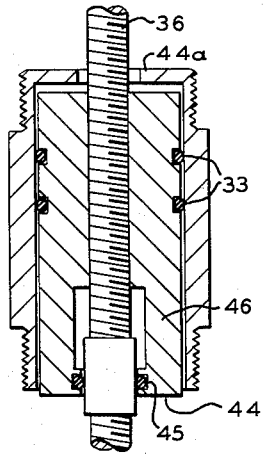

More complete understanding of the invention may be had by reference to the schematic drawing of which FIGURE 1 is a pictorial view of the device of the invention installed on an L.P.G. tank; FIGURE 2 is an elevation, partially in section, of a preferred embodiment of the device of the invention; FIGURE 3 is an elevation of another embodiment of the gas detecting structure; and FIGURE 4 is a view in partial section of another arrangement of the sealing device of FIGURE 2.

Referring to FIGURE 1, a relief valve testing device 9 is attached to a pressure tank 20 to form a seal around the relief valve therein, as shown in FIGURE 2. Auxiliary valve 48 in the wall of tester 9 connects with a small bore tubing 51, the open end of which is positioned under water in vessel 55.

Referring to FIGURE 2, a housing 10 is threaded into a relief valve flange 12 which clamps a relief valve body 14 by means of bolts 16 and nuts 18 to a manhole cover plate or tank shell 20. Gaskets 22 provide a seal between relief valve body 14 and the adjacent members. A relief valve assembly 24 comprising valve head 26, valve stem 28, and compression spring 30 is operatively associated with relief valve body 14 as shown. A sealing cap 32 provided with sealing rings 27 forms an additional seal around the valve head 26.

The device for lifting valve head 26 off its seat for testing the tension and function of valve spring 30 comprises an actuating rod 36 positioned axially in housing 10 and coupled to a connecting rod 38 threaded through cap 32 and into valve head 26. A nut 39 locks threaded coupler 38 to the valve cap 32 and valve head 26. Actuating rod 36 is connected with coupler 38 by means of a clevis joint comprising male and female elements 40 and 41, respectively, attached by pin 42 which is secured by cotter key 43. A valve body 44 is provided in the outer end of housing 10 and provides an inwardly-facing valve seat for a valve head 46 which is threaded onto rod 36 and sealed therewith by means of sealing ring 45. Another sealing ring 47 on the face of valve head 46 engages the seat of valve head 40 and forms a seal therewith. This arrangement provides flexibility and adjustability for testing relief valves of varying design and arrangement with the storage vessel and permits regulation of the space between the valve head 46 and its seat in valve body 44.

Valve body 44 is provided with an annular extension 29 which closely surrounds annular section or valve ring cap 31 of valve head 46. A sealing ring 33, such as an O-ring, is partially imbedded in a groove in annular section 31. This seal ring may also be placed in section 29 of valve body 44. Seal ring 33 and its cooperating elements 29 and 31 provide a seal before the valve head moves, thus making it possible to trap gas thru small leaks thru the relief valve. This sealing arrangement can be constructed so efficiently that the outwardly seating valve formed by elements 44, 46 and 47 may be eliminated. To facilitate this structure, a plurality of seal rings 33 may be spaced along a cylindrical valve head 46 and element 44 is simply a sleeve having a bore cooperating with 46 and seal rings (O-rings) thereon to provide a continuous seal while actuating rod 36 is moving thru its normal operation. Such an arrangement is shown in FIGURE 4 wherein element 44 is annular with a smooth bore, attaching to the inside of housing 10 as by threading or welding, and element 46 has a smooth cylindrical surface except for O-ring slots and O-rings 33. Shoulder 44A limits the outward movement of rod 36 to perform this function of the valve head and seat of FIGURE 2.

An auxiliary valve 48 is positioned in a conduit 49 opening into the side of housing 10. This valve is normally open and is closed by operating lever 50 by chain 51 when valve assembly 24 fails to function properly upon lifting valve head 26. A second housing 52, which may be a continuation of housing 10, is attached to the periphery of valve body 46 or to the outer end of housing 10 by any suitable means, such as threads 53, and encloses and supports a hydraulic cylinder 54 as the operating means for actuating rod 36. The connecting rod 56 of cylinder 54 is coupled to the end of actuating rod 36 by means of a clevis coupling arrangement 57 which is similar to that used in coupling the opposite end of rod 36 with valve coupling member 38. Hydraulic cylinder 54 is supported in housing 52 by means of bracket 58. An inlet connection 59 permits flow of fluid to cylinder 54 and an outlet connection 60 allows venting of fluid therefrom. A handle 62 is attached to the end of the hydraulic cylinder assembly and directly to bracket 58 to provide ease of handling.

Compression fluid for operating cylinder 54 is supplied by means of a flexible line 64 which passes through opening 65 in housing 52 and connects directly with cylinder 54. The opposite end of the tubing is connected with a hydraulic pump 66 which supplies a suitable fluid, such as oil, for operation of the cylinder and actuation of rod 36 in lifting valve head 26 off its seat. A pressure gauge 68 in tubing 64 provides an indication of pressure applied to the actuating cylinder which is used in conventional manner in determining the pressure required to lift valve head 26.

In testing valve assembly 24, fluid is pumped very gradually into cylinder 54 to apply gradually increasing lifting force to valve head 26, until movement of actuating rod 36 in a direction away from the relief valve head compresses spring 30 so as to permit unseating of the valve head and escape of pressured fluid from within the tank or vessel in which the pressured fluid is stored. The safety device of the invention stands ready to function during testing and does so, in the event spring 30 breaks or valve head 26 fails to properly seat for any other reason, by automatic closure of valve head 46 against the valve seat in valve body 44. The operator then can pull lever 50 so as to close valve 48 and cut off the escape of compressed fluid from the housing and the storage vessel with which it is connected. The safety device of the invention also functions to prevent over-compression of spring 30 during testing so as to lessen the danger of spring breakage. Valve head 46 is conveniently positioned on actuating rod 40 to provide only a short distance or space between valve body 44 and valve head 46 so that, as actuating rod 36 moves to the left and pulls valve head 26 off its seat, the travel of the valve head and the amount of spring compression are limited by the limited movement of valve head 46. The threaded engagement between valve head 46 and actuating rod 36 renders the adjustment of the space between the valve head and seat in valve body 44 very simple.

Because of seal ring 33, no fluid can escape from within housing 10 which forms a gas tight testing zone as long as valve 48 is closed. Relief valves of the character shown occasionally form a poor seal between the head and its seat and permit slow leakage after application of only a portion of the pressure required to lift valve head 26. In some instances, the valve leaks slowly even before the application of any lifting pressure. To test for slow leakage during the testing operation from the time the gas tight connection is made between the tester and the tank, until valve head 26 is lifted from its seat, any gas leakage into the zone enclosed by housing 10 is passed thru tube 51 by opening valve 48. Any gas escaping therethru bubbles thru the liquid in vessel 53 is readily detected. If no leakage is detected, the valve head 26 is lifted and quickly returned to its seat providing the valve spring assembly 24 is operating properly. If assembly 24 is not operating properly, the closing of valve 48 acts as a safety measure to prevent fire hazard and loss of valuable fluid from tank 20.

FIGURE 3 shows another arrangement of the leak testing device. A T conduit 49 includes valve 48 in one end of the T and small-bore tube 51 in the other end of the T. A valve 48A is provided in order to prevent escape of fluid when desired, as when valve spring assembly 24 fails.

Other means of detecting small leaks may be utilized in the invention, such as a sensitive manometer connected with the delivery end of tube 51. A small rubber balloon attached to the end of tube 51 also indicates escape of gas when the balloon expands.

The flexible and adjustable character of the actuating rod and coupling means as well as the adjustable character of the valve head in relation to its valve seat is not an esesntial part of the device of the invention, it being feasible to utilize a solid rod which attaches to or screws directly into the relief valve head and makes a coupling or connection with the operating means, such as hydraulic cylinder 54. It is also feasible to utilize other connecting means for actuating rod 36 than that shown in the drawing, e.g., the coupling means shown in the above-identified patent, 2,419,293, including a hook and pull-ring assembly. It is also within the scope of the invention to utilize any suitable operating means in the operation or movement of actuating rod 36 in pulling valve head 26.

In another embodiment, the invention is applicable to the testing of a relief valve for "start-to-discharge" pressure. The "start-to-discharge" pressure or set pressure of a relief valve is its nominal value rating, e.g., 200 p.s.i.g. The valve may exhibit some small degree of leakage at a pressure lower than the set pressure of 200 p.s.i.g., as, for example, at 196 p.s.i.g. This latter pressure is referred to as the "simmer" pressure, which is usually in the range of ½ to 3 percent below the set pressure. At "simmer" pressure, a few bubbles escape thru the liquid in vessel 55. At "start-to-discharge" pressure, there is a flurry of escaping bubbles. In this manner, these pressures may be detected if pump 66 is carefully and slowly operated. The pressures are read on gage 68.

Certain modifications of the invention will become apparent to those skilled in the art and the illustrative details disclosed are not to be construed as imposing unnecessary limitations on the invention.

We claim:

1. In a safety device for testing a relief valve on a fluid-containing vessel comprising a housing adapted to form a sealed attachment around a relief valve; a coupling rod extending thru said housing from the attaching end thereof having means adjacent said end for attaching to the head of said relief valve; means in the end of said housing opposite the attaching end for sealing said housing with said coupling rod comprising an inwardly facing valve seat in the opposite end of said housing surrounding said rod and a valve head on said rod inside said housing adapted to seat in said valve seat on axial movement of said rod away from said relief valve; and a valve in the side of said housing for controlling fluid flow therefrom, the improvement comprising a first annular section on the valve head on said rod extending away from said relief valve; a second annular section on said valve seat concentrically surrounding said first annular section; and slidable sealing means between said first and second annular sections adapted to maintain a fluid tight seal upon limited longitudinal movement of said coupling rod.

2. The device of claim 1 including means connected with the valve in the side of said housing for detecting slow leakage of fluid therethru when same is open.

3. The device of claim 2 wherein last said means comprises a tube of relatively small diameter leading from the outlet side of said valve and including bubble-detecting means on the downstream end of said tube.

4. The device of claim 2 wherein last said means comprises a separate valve means in a conduit connected with the side of said housing and a tube of relatively small diameter connected with the outlet side of said separate valve.

5. The device of claim 1 wherein the valve in the side of said housing is disposed in one end of a T conduit and a separate valve is disposed in the other end of the T, and including a tube of relatively small diameter connected at one end with the outlet of said separate valve.

6. The device of claim 5 including means on the opposite end of said tube for detecting bubbles for gas escaping therefrom.

7. A safety device for testing a relief valve on a pressure vessel containing fluid under pressure comprising a housing adapted to form a sealed attachment around said relief valve; an actuating coupling rod extending thru said housing from the attaching end thereof having means adjacent said end for attaching to the head of said relief valve; slidable sealing means around said rod in said housing opposite the attaching end to provide a gas tight chamber wtihin said housing while said rod is actuating said valve; and auxiliary valve means in said housing leading from said chamber to vent fluid escaping thru said relief valve.

8. The device of claim 7 including a small-bore tube connected with the outlet of said auxiliary valve means provided with gas flow detecting means.

9. The device of claim 7 wherein said auxiliary valve means comprises a T conduit having a valve in each end of the T; and a tube of small bore connected with the outlet of one of said valves.

10. The device of claim 7 wherein said slidable sealing means comprises a collar on said rod sealed therewith and having a cylindrical outer surface provided with at least one seal ring imbedded therein; an annular member sealed with said housing, surrounding said collar and having a smooth inner cylindrical surface cooperating with said at least one seal ring to form a slidable seal for said rod.

11. A process for testing a safety relief valve on a tank containing fluid under pressure which comprises providing an enclosed testing zone sealed with said tank around said relief valve and extending outwardly therefrom; gradually pulling on the head of said valve until venting force is reached; passing any gaseous fluid escaping into said zone thru said valve, from prior to application of pressure until said valve head is lifted off its seat, thru a gas detecting zone to detect slow leakage thru said valve.

12. The process of claim 11 wherein escaping gas is passed thru a liquid to form escaping bubbles.

13. A process for detecting slow leakage thru a safety relief valve on a tank containing stored L.P.G. which comprises providing an enclosed zone around said relief valve sealed with said tank and extending outwardly therefrom; gradually applying outward pressure on the head of said valve until same is lifted from its seat; passing any gas escaping into said zone thru said valve, prior to the lifting of said valve head, from said zone thru a tube of small bore into a gas flow detecting zone to detect slow leakage thru said valve.

14. The process of claim 13 wherein the downstream end of said tube is placed under a liquid so as to form escaping bubbles.

15. The process of claim 11 including lifting the valve head off its seat and releasing the pulling force thereon to test the relief operation of said valve and the pressure at which relief is effected.

References Cited in the file of this patent
UNITED STATES PATENTS

| | | |
|---|---|---|
| 1,592,389 | Spill | July 13, 1926 |
| 1,685,454 | Johnson | Sept. 25, 1928 |
| 2,129,763 | Hart | Sept. 13, 1938 |
| 2,431,437 | Van Der Werff | Nov. 25, 1947 |
| 2,713,989 | Bryant | July 26, 1955 |
| 2,952,151 | Simonson et al. | Sept. 13, 1960 |